Dec. 17, 1968 W. C. SHEEHAN 3,416,772
METHOD OF FIBRILLATION
Filed June 3, 1966

INVENTOR
W.C. SHEEHAN
BY Young & Quigg
ATTORNEYS

3,416,772
METHOD OF FIBRILLATION
William C. Sheehan, Bartlesville, Okla., assignor to Phillips Petroleum Company, a corporation of Delaware
Filed June 3, 1966, Ser. No. 555,029
7 Claims. (Cl. 225—3)

This invention relates to a method for fibrillating plastic film.

Heretofore, oriented plastic film has been fibrillated, i.e., split into a unitary coherent network of longitudinally extending stem fibers integrally joined to one another at random points along the length thereof by a plurality of shorter, smaller diameter cross fibers, by many methods including stretching of the oriented film in a direction substantially normal to the orientation direction of that film.

It has now been found that a fibrillated product whose stem fibers are substantially more uniform in width than was generally obtained heretofore can be manufactured with a higher throughput (fibrillation rate) by subjecting the film to tbe fibrillated to localized stresses that act in at least one direction substantially parallel to the orientation direction of the film. The localized stresses are applied to a finite portion of the film, the width of this portion being substantially less than the full width of the film, and are then progressively moved from finite portion to finite portion substantially laterally across the film until substantially the whole width of the film has been subjected to the stresses.

Accordingly, it is an object of this invention to provide a new and improved fibrillation method.

Other aspects, objects, and the several advantages of this invention will be apparent to those skilled in the art from the description, drawings, and appended claims.

Figure 1:
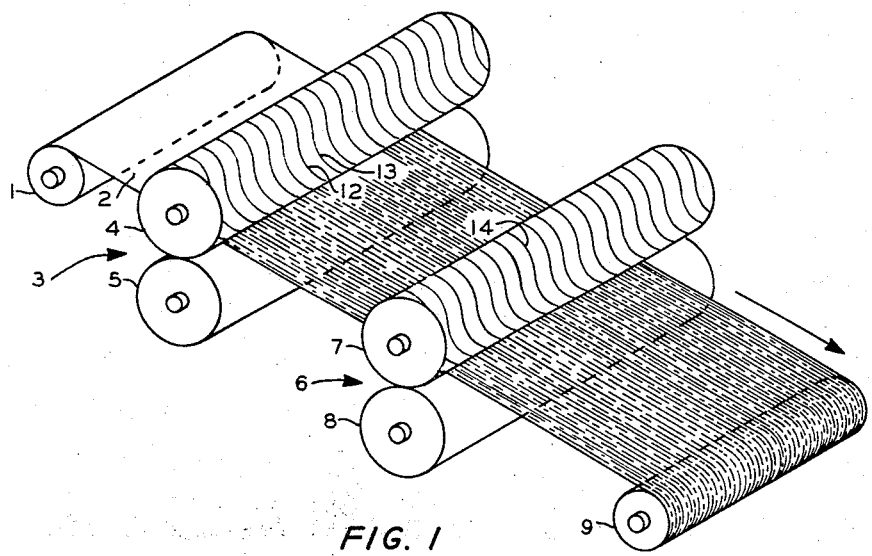

FIGURE 1 shows a system embodying this invention.

Figure 2:
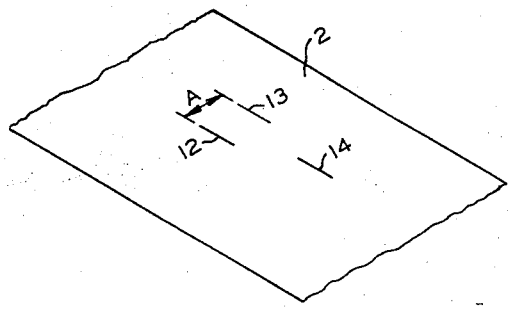

FIGURE 2 shows a portion of film 2 and rollers 4 and 7 of FIGURE 1.

FIGURE 1 shows a feed roll 1 containing longitudinally oriented plastic film 2. Film 2 from roll 1 passes between a first set of rollers 3 composed of an upper spirally grooved (threaded) roller 4 and a lower smooth roller 5. The film then passes between a second downstream set of rollers 6 composed of an upper spirally grooved roller 7 and a lower smooth surfaced roller 8. The fibrillated film issuing from between the nips of roller set 6 is taken up on roll 9 for storage, further treatment, and the like.

Rollers 5 and 8 can be formed from any resilient or semi-resilient convetnional roller material such as hard rubber, and the like. Generally, a rubber roller employed as rollers 5 and 8 will have a Durometer hardness of from about 50 to about 150. Grooved rollers 4 and 7 will generally be metal, e.g., stainless steel.

The grooved rollers can be made in any conventional manner so long as they are spirally grooved. A particularly suitable method for grooving a smooth stainless steel roller is to simply thread the roller and then machine off the sharp edge of the threads so that flat, sharp-cornered surfaces remain. These flat surfaces will bear upon the film as it passes thereunder thereby leaving finite portions of the film between adjacent flat surfaces free for longitudinal movement.

Downstream roller 7 is oriented with respect to upstream roller 4 so that the flat surfaces of the threads of roller 7 are spaced intermediate the flat surfaces of the threads of roller 4. Further, roller 7 is rotated at a peripheral speed greater than roller 4 so that there is a longitudinal stressing tendency of the film passing between roller groups 3 and 6. Thus, the portion of the film that is in contact with the flat thread surfaces of roller 4 is pulled longitudinally slower than adjacent portions of the film that are free to move longitudinally with respect to the adjacent portions of the film that are held by the flat surfaces. Because the portion of the film that extends between adjacent flat surfaces on roller 4 is free to move but adjacent portions are not localized stresses are set up which act in a direction substantially parallel to the orientation direction of the film. These localized stresses are progressively moved across the full width of the film because of the spiral nature of the threads.

The relative arrangement of the threads of rollers 4 and 7 can be seen in FIGURE 2 wherein film 2 is shown and a portion of two threads 12 and 13 of roller 4 are shown as is a portion of a single thread of roller 7. It can be seen that thread 14 bears on the film at a point intermediate the distance between threads 12 and 13 thereby causing a localized stress in the width portion A of film 2 since the threads on roller 7, including thread portion 14, are moving faster than the threads, including the thread portions 12 and 13, of roller 4. Thus, in the width A, that portion of film 2 is pulled longitudinally faster than adjacent portions of film 2 which are held back by reason of their being in contact with thread portions 12 and 13.

The rollers themselves can be of any diameter and can be spaced any distance from one another but are preferably at least one circumference space from one another, the circumference being the smaller of the two grooved rollers if they differ in diameter which they preferably do not. Normally, only the grooved rollers are driven, the smooth rollers being idler rollers. The peripheral speed of roller 7 should be at least 1.1 times the peripheral speed of roller 4 and is preferably in the range of from about 1.1 to about 2.5 times the peripheral speed of roller 4. The peripheral speed of roller 4 can vary widely, for example from as low as 10 revolutions per minute to as high as 1000 or more revolutions per minute depending upon the degree of fibrillation desired, the type of film treated, the orientation of that film, and the like. Also, if desired, more than 2 sets of rollers can be employed. For example, for thicker, tougher, less oriented film three or more sets of rollers can be employed in a manner similar to that shown in FIGURE 1.

The spiral grooves on rollers 4 and 7 can vary widely as to thieir pitch and spacing along the longitudinal length of the rollers themselves, the longitudinal length of the rollers being that length which in FIGURE 1 is substantially normal to the longitudinal axis of the film 2. The extent to which a film is fibrillated can be controlled to some degree by varying the number of threads present on the surface of the rollers per linear inch along the longitudinal axis of the roller. For example, fibrillation can be obtained when as few as three threads per inch are present; however, fibrillated products having finer stem and cross fibers are formed with larger numbers of threads per inch, e.g., 10 to 20 threads per inch.

The grooved rollers may be threaded either in a left-hand or right-hand manner so that both rollers 4 and 7 are threaded in the same manner or in opposite manners.

The amount of stress applied to the oriented film will vary widely. Although presently apparently not necessary, it appears desirable that the localized portion of the film that is under stress move a finite distance relative to the rest of the film thereby causing shear between the interfaces of the portion of the film under stress and the adjacent portions of the film which are retained and prevented from moving along with the portion under stress. The amount of movement of the stressed portion can be very small but will generally be for a distance at least equal to the thickness of the film, the maximum distance being limited only by that which is practical for the particular apparatus employed.

Generally, any orientable plastic film can be employed in the process of this invention. The film can be uniaxially oriented or multiaxially oriented in any way which allows fibrillation. The film can be oriented in any conventional manner well known to those skilled in the art including super-cooling the film and then orienting same by stretching and the like or heating the film to a temperature below that at which the film is in the molten state and then stretching same. By orientation, what is generally meant to be covered is deforming, e.g. stretching the film below that temperature at which the film is substantially in the molten state, to thereby increase the strength of the film at least in the direction in which it is deformed.

Generally, films of homopolymers and copolymers of 1-olefins having from 2 to 8 carbon atoms per molecule which have been oriented by stretching in at least one direction so that the film after stretching is at least 3 times as long in the direction of stretching than it was before stretching, i.e., a draw ratio of 3 to 1, can be used. When film of polyethylene which has a density of at least about 0.94 gram per cubic centimeter (ASTM D 1505–63T) is employed the ratio of length in the stretched direction to original length should be at least 4 to 1 and when polypropylene is employed this draw ratio should be at least 6 to 1. Polymers of 1-olefins can be made in any conventional manner, such as by the process of U.S. Patent 2,825,721, or with any of the well-known organometal catalyst systems. The film can be made from the polymers in any conventional manner such as by melt extrusion, casting, flattening blown tubing, and the like.

Other conventional plastic films that can be employed in this invention include blends of 1-olefin polymers as above-described with each other and with other polymers such as polyamides (nylons), polyesters, polyvinyl alcohol, acrylic polymers, and the like. Of course, these other polymers can also be employed alone as well as in blends. A draw ratio of at least 3 to 1 can also be employed with these plastic films.

The film can be of any length and width and substantially any thickness, the minimum thickness of the film being that which will produce a substantially self-sustaining film and the maximum thickness being dictated by the capability of the apparatus employed. Preferably, the thickness of the film will vary from that which is sufficient to form a self-sustaining film to about 6 mils. Thicker films can be treated by using heavier duty apparatus or, in the case of the apparatus of FIGURE 1, three or more sets of rollers.

Brushes, air jets, and the like can be used to keep the rollers and film clean from dirt and other particles that may collect thereon.

EXAMPLE

A film composed of a homopolymer of propylene having a melt flow of from 2.5 to 4 (ASTM D 1238–62T, Condition L, grams per 10 minutes) and a flexural modulus equal to or greater than 200,000 (ASTM D790–63, 73° F., p.s.i.) was drawn at a temperature of 320° F. using a draw ratio of 9 to 1. A drawn film was obtained which was 3.5 inches wide and 0.7 of a mil thick. This film was fed to a pair of rollers spaced 12 inches apart that were set up as shown in FIGURE 1 except that the grooved rollers were placed under the smooth rollers, and the film was separated after leaving the last pair of rollers by use of an air knife. Both rollers in each pair were 3.75 inches in diameter. The solid, nongrooved roller was made of a hard rubber having a Durometer hardness of 90. The grooved roller was a stainless steel roller that had been threaded with No. 14 threads so that there were 14 threads per linear inch along the longitudinal axis of the roller. The threads of the roller were machined to leave a flat, sharp-cornered surface having a flat width of about 0.02 inch. The upstream grooved roller had a right-hand spiral and the other a left-hand spiral. A brush was employed on the smooth rollers and a tangential air jet was employed on the grooved rollers to keep all the rollers clean.

The upstream pair of rollers were operated at various speeds in the range of from 20 to 100 r.p.m. with the downstream pair of rollers operating at speeds in the range of 1.2 to 2 times that of the first pair.

In all cases a fibrillated product was obtained which had stem fibers that were of surprisingly uniform width across the full width of the fibrillated film.

Reasonable variations and modifications are possible within the scope of this disclosure without departing from the spirit and scope thereof.

I claim:

1. In a fibrillation process, the improvement comprising subjecting a fibrillatable film to at least one localized stress acting in a direction substantially parallel to the orientation direction of said film, said at least one stress being applied to a first finite portion of said film, the width of said finite portion being substantially less than the full width of said film, and progressively moving said at least one stress substantially laterally across said film until substantially the whole width of said film has been subjected to said at least one stress.

2. The method according to claim 1 wherein said film is formed from at least one of homopolymers and copolymers of 1-olefins having from 2 to 8 carbon atoms per molecule, polyamides, polyesters, polyvinyl alcohol, acrylic polymers, and mixtures thereof with one another and polymers of 1-olefins.

3. The method according to claim 1 wherein said film is oriented using a drawing ratio of at least 3 to 1.

4. The method according to claim 1 wherein said stress is sufficient to cause finite movement of the stressed portion in the direction of stressing and relative to the rest of the film which is held back.

5. The method according to claim 1 wherein the stressing is caused by at least two spaced apart spirally grooved rollers, each operating in opposition to smooth surfaced rollers, at least one downstream roller rotating faster than the first upstream roller.

6. The method according to claim 1 wherein said film is formed from polyethylene which has been oriented with a drawing ratio of at least 3 to 1 and the movement of the stressed portion in the direction of stressing is at least equal to the thickness of the film being fibrillated.

7. The method according to claim 1 wherein said film is formed from polypropylene which has been oriented with a drawing ratio of at least 6 to 1, and the movement of the stressed portion in the direction of stressing is at least equal to the thickness of the film being fibrillated.

References Cited

UNITED STATES PATENTS 2,985,503   5/1961   Becker.
3,235,644   2/1966   Rasmussen.

ROBERT F. WHITE, *Primary Examiner.*

S. I. LANDSMAN, *Assistant Examiner.*

U.S. Cl. X.R.

28—1, 72; 264—147

Disclaimer and Dedication 3,416,772.—*William C. Sheehan*, Bartlesville, Okla. METHOD OF FIBRILLATION. Patent dated Dec. 17, 1968. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]